United States Patent
Nagata (10) Patent No.: US 9,870,156 B2
(45) Date of Patent: Jan. 16, 2018

(54) MEMORY SYSTEM AND METHOD OF CONTROLLING MEMORY SYSTEM

(71) Applicant: Toshiba Memory Corporation, Minato-ku (JP)

(72) Inventor: Yuki Nagata, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 716 days.

(21) Appl. No.: 14/453,039

(22) Filed: Aug. 6, 2014

(65) Prior Publication Data

US 2015/0234605 A1    Aug. 20, 2015

Related U.S. Application Data

(60) Provisional application No. 61/940,136, filed on Feb. 14, 2014.

(51) Int. Cl.
   *G06F 3/06* (2006.01)
   *G06F 13/24* (2006.01)
   *G06F 13/16* (2006.01)

(52) U.S. Cl.
   CPC .......... *G06F 3/0613* (2013.01); *G06F 3/0659* (2013.01); *G06F 3/0679* (2013.01); *G06F 13/1642* (2013.01); *G06F 13/24* (2013.01); *G06F 2206/1014* (2013.01)

(58) Field of Classification Search
   None
   See application file for complete search history.

(56) References Cited

U.S. PATENT DOCUMENTS

| | | | |
|---|---|---|---|
| 6,065,089 A | 5/2000 | Hickerson et al. | |
| 2005/0114608 A1* | 5/2005 | Oshima | G06F 12/0862 |
| | | | 711/137 |
| 2012/0173801 A1 | 7/2012 | Sasaki | |
| 2013/0086311 A1 | 4/2013 | Huang et al. | |
| 2014/0006744 A1* | 1/2014 | Konta | G06F 13/1689 |
| | | | 711/169 |

* cited by examiner

*Primary Examiner* — Idriss N Alrobaye
*Assistant Examiner* — Dayton Lewis-Taylor
(74) *Attorney, Agent, or Firm* — Oblon, McClelland, Maier & Neustadt, L.L.P.

(57) ABSTRACT

According to one embodiment, a memory system is provided wherein an interruption generating unit generates an interruption signal for one or more commands executed by a transfer executing unit when an end number counter is greater than or equal to a first threshold. A transfer type conjecturing unit determines whether the transfer type of a first command to be executed after transmitting the interruption signal is sequential transfer or random transfer and sets the first threshold at a value different between when determining being the sequential transfer and when determining being the random transfer.

20 Claims, 4 Drawing Sheets

| No. | START ADDRESS | TRANSFER SIZE | TRANSFER DIRECTION |
|---|---|---|---|
| 1 | 0x0000 | 0x1000 | WRITE (HOST TO DEVICE) |
| 2 | 0x1000 | 0x1000 | WRITE (HOST TO DEVICE) |
| 3 | 0x2000 | 0x1000 | WRITE (HOST TO DEVICE) |
| 4 | 0x3000 | 0x1000 | READ (DEVICE TO HOST) |
| 5 | 0x6000 | 0x1000 | READ (DEVICE TO HOST) |
| 6 | 0x7000 | 0x1000 | READ (DEVICE TO HOST) |

FIG.4B

| ADDRESS | TRANSFER TYPE |
|---|---|
| 0x0000 | SEQUENTIAL |
| 0x1000 | SEQUENTIAL |
| 0x2000 | SEQUENTIAL |
| 0x3000 | RANDOM |
| 0x4000 | ... |
| 0x5000 | ... |
| 0x6000 | SEQUENTIAL |
| 0x7000 | SEQUENTIAL |
| 0x8000 | ... |

MEMORY SYSTEM AND METHOD OF CONTROLLING MEMORY SYSTEM

CROSS-REFERENCE TO RELATED APPLICATIONS

This application is based upon and claims the benefit of priority from U.S. Provisional Application No. 61/940,136, filed on Feb. 14, 2014; the entire contents of which are incorporated herein by reference.

FIELD

Embodiments described herein relate generally to a memory system and method of controlling memory system.

BACKGROUND

As to systems using storage devices such as SSDs (Solid State Drives), with the scale of the systems increasing and the processing speed increasing, reduction in overhead associated with interruptions by storage devices as responses to instructions from a host is required of the systems.

As data transfer in the storage device, there is random transfer which transfers individually data each of a size no larger than a data-transfer unit as well as sequential transfer. In the sequential transfer, by executing one interruption collectively for multiple commands, with improving throughput, overhead of interruption processing can be reduced. In contrast, in the random transfer, latency is often an index of performance. Accordingly, the number of commands to be dealt with together needs to be decreased or the time-out interval from when a command is received until an interruption is generated needs to be reduced.

DETAILED DESCRIPTION

According to one embodiment, a memory system is provided which comprises a nonvolatile storage unit, a command receiving unit, a command transmitting unit, a command queue, a transfer executing unit, an end number counter, an interruption generating unit, and a transfer type conjecturing unit. The command receiving unit receives commands from a host, and the command transmitting unit transmits an interruption signal upon the execution of the commands to the host. The command queue queues the commands. The transfer executing unit executes the commands queued in the command queue sequentially to write data into the nonvolatile storage unit or to read data from the nonvolatile storage unit. The end number counter, after transmitting the interruption signal to the host, counts the number of commands received by the command receiving unit and the execution of which the transfer executing unit has finished. The interruption generating unit generates an interruption signal for the commands executed by the transfer executing unit, the number of the commands being one or greater, when the end number counter is greater than or equal to a first threshold. The transfer type conjecturing unit determines whether the transfer type of a first command to be first executed after transmitting the interruption signal, which is queued in the command queue, is sequential transfer or random transfer and sets the first threshold at a value different between when determining being the sequential transfer and when determining being the random transfer.

The memory systems and methods of controlling the same according to embodiments will be described in detail below with reference to the accompanying drawings. The present invention is not limited to these embodiments.

(First Embodiment)

Figure 1:
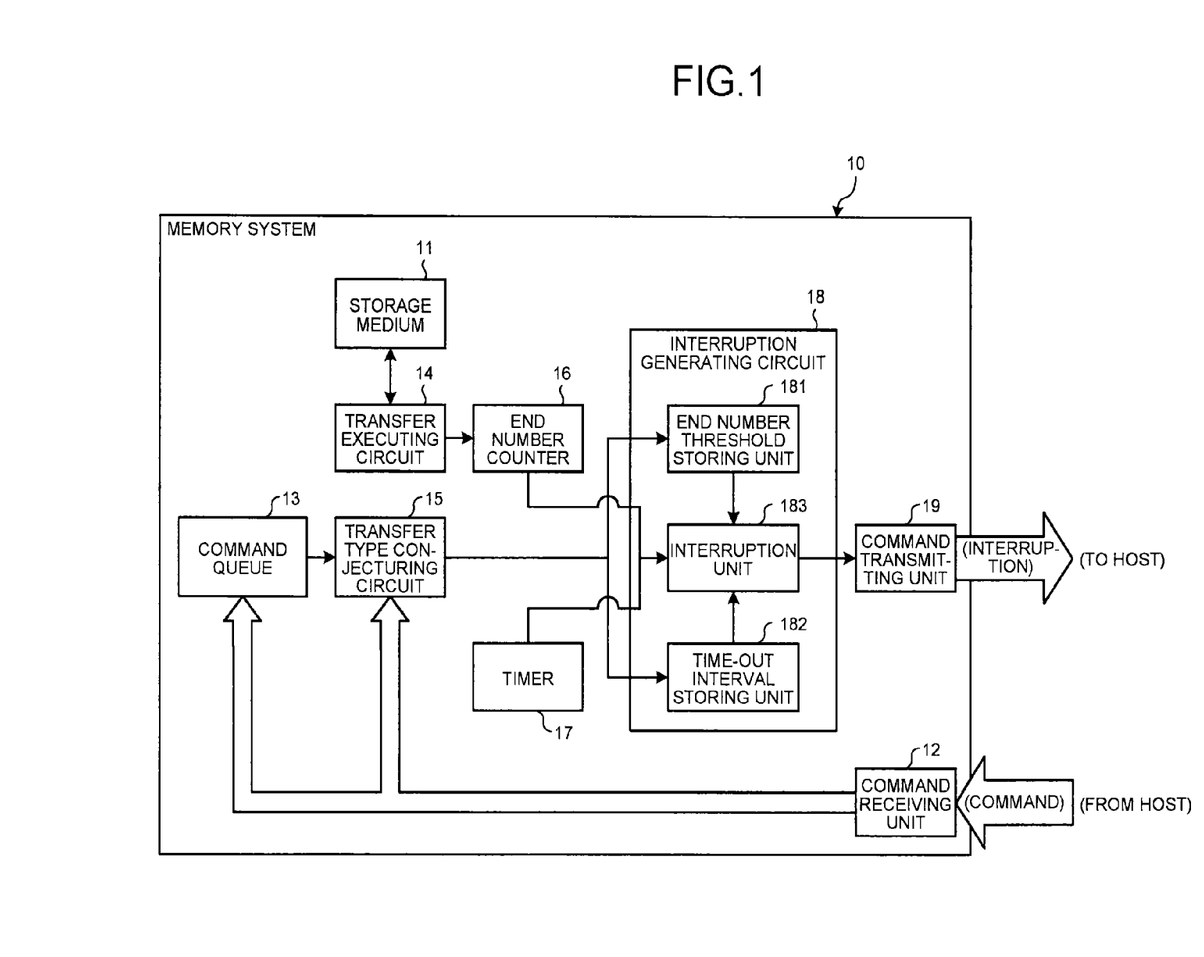
FIG. 1 is a block diagram showing schematically the configuration of a memory system according to a first embodiment.

FIG. 1 is a block diagram showing schematically the configuration of a memory system according to the first embodiment. This memory system 10 is connected to a host via an HBA (Host Bus Adapter). The HBA, when a command from the host is registered, performs the process of acquiring the content of the command from the system memory of the host based on an HBA memory register that designates the information storing place in the system memory of the host and accessing the memory system 10 based on that content to return the result to the host. The host and the HBA are connected by, e.g., PCI (Peripheral Component Interconnect), PCI-X, or PCIe (PCI Express), and the HBA and the memory system 10 are connected by, e.g., SATA (Serial Advanced Technology Attachment). In this figure, a processing unit is shown which is necessary to write and read data into and from a storage medium 11 according to commands from the host (host CPU).

This memory system 10 comprises the storage medium 11, a command receiving unit 12, a command queue 13, a transfer executing circuit 14, a transfer type conjecturing circuit 15, an end number counter 16, a timer 17, an interruption generating circuit 18, and a command transmitting unit 19.

The storage medium 11 stores user data transmitted from the host, management information about the memory system 10, system data, and so on. The storage medium 11 is constituted by, e.g., an NAND memory or the like. The NAND memory has memory cell arrays where multiple memory cells are arranged in a matrix. Each individual memory cell may be capable of binary storage or capable of multivalue storage. The NAND memory is composed of a number of memory chips, and each memory chip is composed of multiple physical blocks arranged, which are units for data erasure. As to the NAND memory, data is written into and read from it on a physical page basis. The physical block is composed of multiple physical pages. Note that a logical page into which multiple physical pages are combined may be used as a unit for data writing or reading. Also, a logical block into which multiple physical blocks are combined may be used as a unit for data erasure.

The command receiving unit 12 converts a command received in compliance with a communication protocol between the host and itself into a command defined in the memory system 10 and hands it over to the command queue 13 and the transfer type conjecturing circuit 15.

The command queue 13 stores commands from the command receiving unit 12. The command includes an access target address in the storage medium 11 and a size.

The transfer executing circuit 14 executes commands stored in the command queue 13 sequentially. In the case of a write command, data of the size specified by the command is written at the address specified by the command and following addresses in the storage medium 11. In the case of a read command, data of the size specified by the command is read from the address specified by the command and following addresses in the storage medium 11. Note that writing or reading data is performed in units of a predetermined size (page units in the case of the NAND memory).

The transfer type conjecturing circuit 15, after the command transmitting unit 19 transmits an interruption signal to the host, when the command receiving unit 12 receives a command, conjectures whether data transfer ordered by a command issued from the host is sequential transfer or random transfer, for the command from the command receiving unit 12 and commands stored in the command queue 13 and changes parameters concerning timings when to have the interruption generating circuit 18 generate an interruption. An end number threshold and a time-out interval can be cited as the parameters concerning timings when to generate an interruption. The end number threshold is the number of interruption factors to be accumulated after transmitting an interruption signal and then executing commands stored in the command queue 13 until generating an interruption to the host. The interruption factors are the results of the transfer executing circuit 14 executing the commands, and the number of interruption factors coincides with the number of commands executed by the transfer executing circuit 14. The time-out interval is the time from transmitting an interruption signal and then executing commands stored in the command queue 13 until generating an interruption to the host. This is for having an interruption occur when a time specified by the time-out interval passes even if being left with the number of interruption factors being short of the end number threshold.

The end number counter 16, after transmitting an interruption signal (i.e., the interruption generating circuit 18 performs interruption) and then the transfer executing circuit 14 finishes executing a command, increments the count by 1. When the interruption generating circuit 18 performs interruption, the end number counter 16 is reset.

The timer 17, after transmitting an interruption signal (i.e., the interruption generating circuit 18 performs interruption), starts measuring a time from when the transfer executing circuit 14 starts executing a command. When the interruption generating circuit 18 performs interruption, the timer 17 is reset.

The interruption generating circuit 18 generates an interruption to the host based on the parameters concerning timings when to generate an interruption, which parameters are set by the transfer type conjecturing circuit 15. The interruption generating circuit 18 includes an end number threshold storing unit 181, a time-out interval storing unit 182, and an interruption unit 183.

The end number threshold storing unit 181 stores the end number to be counted by the end number counter 16. This end number is updated by the transfer type conjecturing circuit 15 as mentioned above.

The time-out interval storing unit 182 stores the time-out interval to be counted by the timer 17. This time-out interval is updated by the transfer type conjecturing circuit 15 as mentioned above.

The interruption unit 183, when the count of the end number counter 16 exceeds the end number threshold or when the timer 17 finishes counting the time-out interval, generates a result of transfer processes executed by the transfer executing circuit 14, that is, a response (an interruption signal) to commands received by the command receiving unit 12 and executed by the transfer executing circuit 14 and transmits to the host. Note that if the end number threshold is greater than or equal to two, the interruption unit 183 generates a combined interruption of interruption signals for a predetermined number of commands.

The command transmitting unit 19 transmits to the host the interruption signal generated by the interruption generating circuit 18 for commands received from the host in compliance with the communication protocol between the host and itself.

Here, the conjecturing of the transfer type by the transfer type conjecturing circuit 15 and the updating of the end number threshold and the time-out interval based on its result will be described.

The conjecturing of the transfer type by the transfer type conjecturing circuit 15 is performed, for example, using the addresses and sizes in the commands stored in the command queue 13 and the address and size in the command received. Specifically, if an address obtained by adding to the address specified by a command A (e.g., a command A stored in the command queue 13) to be first executed after transmitting an interruption signal the data size included in the command A, is the address specified by a received command (the command to be executed next to the command A), then the transfer type conjecturing circuit 15 determines being sequential transfer. On the other hand, if an address obtained by adding the data size to the address specified by a command A (e.g., a command A stored in the command queue 13) to be first executed after transmitting an interruption signal, is not the address specified by a received command (the command to be executed next to the command A), then the transfer type conjecturing circuit 15 determines being random transfer.

When determining being sequential transfer in the above way, the transfer type conjecturing circuit 15 sets the end number threshold to be greater and the time-out interval to be longer. The reason for this is to suppress host overhead per unit data transferred in the case of sequential transfer. On the other hand, when determining being random transfer, the transfer type conjecturing circuit 15 sets the end number threshold to be smaller than the end number threshold for sequential transfer and the time-out interval to be shorter. The reason for this is to make the transfer finish time as early as possible with reducing host overhead due to the occurrence of interruptions.

These settings are not uniquely decided on, but are done according to the operation status of the actual memory system 10, varying depending on the type of data to be stored and the like. For example, where in sequential transfer performed when the memory system 10 is actually operating, access to consecutive areas in the storage medium 11 is executed by five consecutive commands on average, the end number threshold is set to "5". Where the average time that the transfer executing circuit 14 takes to execute five commands is 10 msec, the time-out interval is set to "10".

In contrast, for random transfer, the end number threshold should be smaller than for sequential transfer, and the time-out interval should be shorter. Accordingly, one interruption may be performed per command. Or, in order to decrease processing load on the host, for example, the end number threshold may be set to "2", and the time-out interval may be set to "2" (4 msec) so as to reduce the number of interruption times.

As such, the end number threshold and the time-out interval are decided on for sequential transfer and for random transfer in relation to each other according to the actual situation of the memory system 10.

Figure 2:
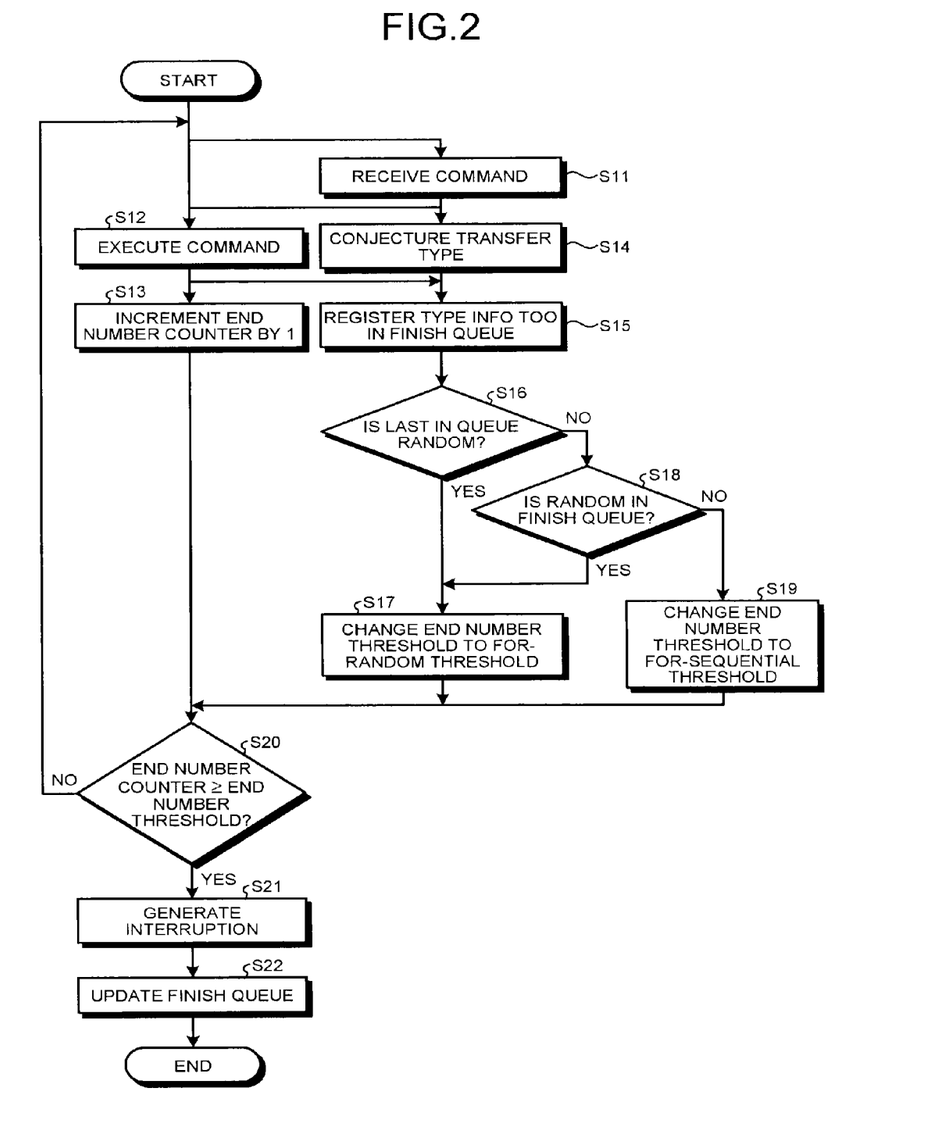
FIG. 2 is a flow chart showing an example procedure of a method of controlling the memory system according to the first embodiment.

Next, a method of controlling the memory system 10 will be described. Here, the case of determining whether the process caused by a command is sequential transfer or random transfer so as to change the end number threshold will be described. FIG. 2 is a flow chart showing an example procedure of the method of controlling the memory system 10 according to the first embodiment.

First, the command receiving unit 12 receives a command from the host (step S11). Here, the command receiving unit 12 converts the received command into a command in a format recognizable in the memory system 10 to store in the command queue 13 and hand it over to the transfer type conjecturing circuit 15.

Then, the transfer executing circuit 14 executes a command stored in the command queue 13 (step S12). When the transfer executing circuit 14 finishes executing the command, the command is registered in a finish queue (not shown), and the end number counter 16 counts up by 1 (step S13).

In parallel with the process of steps S12 to S13, the transfer type conjecturing circuit 15 conjectures the transfer type (step S14) and registers the resulting transfer type in the finish queue (step S15). The conjecturing of the transfer type is to determine being sequential transfer or being random transfer depending on whether an address obtained by adding the data size to the address specified by the command to be first executed which is stored in the command queue 13, is equal to the address specified by the command received (to be executed) next to that command.

Then, the transfer type conjecturing circuit 15 determines whether type information about the execution finished command (the last in the queue) registered in the finish queue indicates being random transfer (step S16). If type information about the last in the queue indicates being random transfer (Yes at step S16), then the transfer type conjecturing circuit 15 changes the end number threshold to a for-random threshold (step S17). Here, if type information about the command finished immediately before indicates being random transfer, it can remain the same without a change because a for-random threshold is already set.

If at step S16, type information about the last in the queue indicates being not random transfer (No at step S16), then the transfer type conjecturing circuit 15 determines whether there is a command of random transfer in the finish queue (step S18). If there is a command of random transfer in the finish queue (Yes at step S18), then the transfer type conjecturing circuit 15 changes the end number threshold to a for-random threshold at step S17. In contrast, if there is no command of random transfer in the finish queue (No at step S18), then the transfer type conjecturing circuit 15 changes the end number threshold to a for-sequential threshold (step S19). Here, if there is another finished command than the command finished immediately before in the finish queue, it can remain the same without a change because a for-sequential threshold is already set.

After the process in step S13 finishes subsequent to step S17 or S19, the interruption generating circuit 18 determines whether the value of the end number counter 16 is greater than or equal to the end number threshold (step S20). If the value of the end number counter 16 is less than the end number threshold (No at step S20), the process returns to step S11. If the value of the end number counter 16 is greater than or equal to the end number threshold (Yes at step S20), the interruption generating circuit 18 generates an interruption signal to indicate the execution being finished of the commands, which have been executed by the transfer executing circuit 14 (step S21) to transmit to the host. Further, the interruption generating circuit 18 updates (resets) the finish queue (step S22), and the process ends.

In the flow chart shown in FIG. 2, the interruption generating circuit 18 does not perform an interruption until an equal number of commands to the end number threshold have been executed. Hence, there is the possibility that the state where an interruption cannot be generated may be maintained. Accordingly, having the timer 17 count a predetermined time (the time-out interval), the interruption generating circuit 18 performs an interruption when the timer 17 finishes counting the time-out interval, regardless of the value of the end number counter 16. The execution of an interruption due to the counting of the time-out interval by the timer 17 can occur in any process step in the flow chart of FIG. 2.

In the first embodiment, the transfer type conjecturing circuit 15 conjectures whether to be sequential transfer or random transfer based on a received command and commands stored in the command queue 13 and if being sequential transfer, sets the end number threshold at a relatively large value and if being random transfer, sets the end number threshold at a smaller value than for sequential transfer. And when the end number counter 16 counts up to a value greater than the end number threshold, an interruption is made to occur. Thus, the occurrence timings of interruptions can be dynamically changed in the memory system 10 according to whether to be sequential transfer or random transfer, which has the effect that processing load on the host can be reduced with securing performance. The change of the end number threshold can be performed without invalidating the functions of the processing unit in the memory system 10, thus with no overhead occurring.

In a system complying with, e.g., AHCI (Advanced Host Controller Interface) Standard, the host sets various settings in the HBA in advance, and the HBA automatically performs a command process and masks an interruption notification from the memory system 10, thereby reducing the number of interruptions to the host, and thus processing load on the host can be reduced. In contrast, according to the present embodiment, the memory system 10 can dynamically change the occurrence timings of interruptions according to whether to be sequential transfer or random transfer, and hence the number of interruptions to the host can be reduced without setting the HBA to mask an interruption notification from the memory system 10.

In the case where CCC (Command Completion Coalescing) defined in AHCI Standard is supported, in order to secure performance at random transfer, the HBA can change the number of commands for one interruption or the time-out time until an interruption occurs for commands, between for sequential transfer and for random transfer, but when changing settings, the function of the CCC has to be invalidated temporarily, and thus overhead according thereto occurs. In contrast, according to the present embodiment, because the memory system 10 can dynamically change the occurrence timings of interruptions according to whether to be sequential transfer or random transfer, a setting change by the HBA for reducing the number of interruptions to the host is not needed.

Also when the time specified by the time-out interval elapses since the execution of commands starts, an interruption is performed, and thus it also has the effect that an interruption can be prevented from being in a wait state for a longer time than necessary even if the memory system is in a wait state with the number of executed commands being short of the end number threshold.

(Second Embodiment)

In the first embodiment, the transfer type is conjectured based on information at the time of receiving a command. In the second embodiment, the case where the transfer type is conjectured based on the tendency of commands received in the past will be described.

Figure 3:
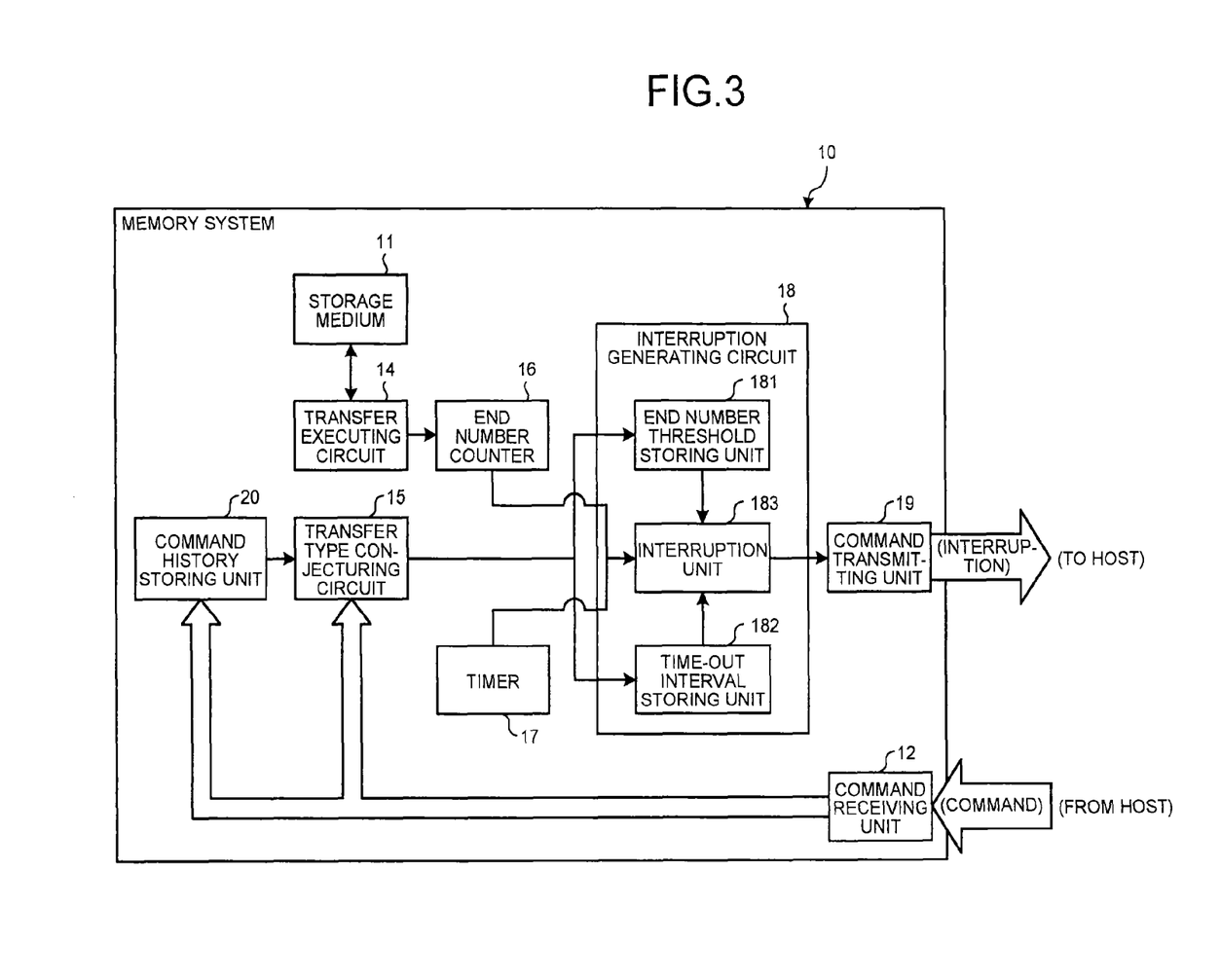
FIG. 3 is a block diagram showing schematically the configuration of a memory system according to a second embodiment.

FIG. 3 is a block diagram showing schematically the configuration of a memory system according to the second embodiment. This memory system 10 has a command history storing unit 20 instead of the command queue 13 of the first embodiment.

The command history storing unit 20 stores command history information, in which is accumulated information including, for each received command, whether it is a data transfer command, the transfer direction (read or write), the access area, and the transfer type indicating whether access to the access area is sequential transfer or random transfer. In the second embodiment, the case where the command history information comprises command information that stores a predetermined number of command histories in a time sequence and type information about the access areas created from the results of conjecturing the transfer type based on the command information will be described. The command information can be constituted by a FIFO (First In, First Out).

Figure 4A:
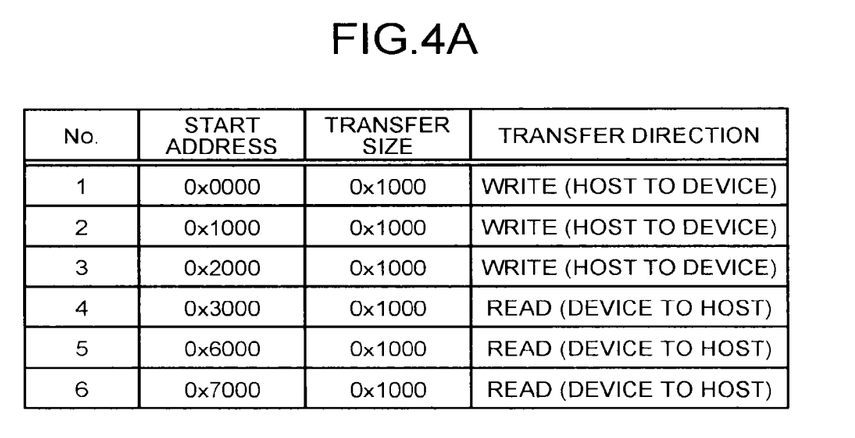
FIG. 4A is a diagram showing an example of command information.
Figure 4B:
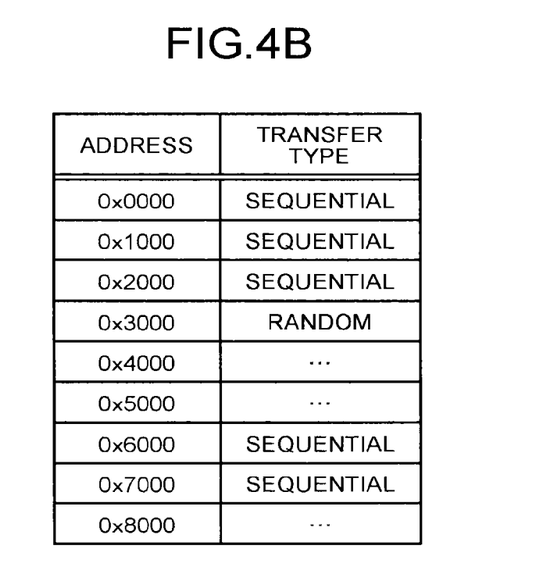
FIG. 4B is a diagram showing an example of type information.

FIGS. 4A and 4B are diagrams showing an example of the command history information; FIG. 4A is a diagram showing an example of the command information; and FIG. 4B is a diagram showing an example of the type information. As shown in FIG. 4A, the command information includes start addresses, transfer sizes, and transfer directions. The command information stores a predetermined number of commands in the order of from the latest command in a time sequence. In this figure, No. 1 is the oldest command, and those commands are ones received in the order of from No. 1 to No. 6, the latest, in a time sequence. When the command information (FIFO) is filled with data, the oldest data is taken out, and new data is stored. Meanwhile, the type information includes addresses and the transfer types as shown in FIG. 4B.

In the command information of FIG. 4A, three commands No. 1 to No. 3 are of write (data transfer from the host to the memory system 10). The value obtained by adding its transfer size to the start address of command No. 1 is the start address of command No. 2, and the value obtained by adding its transfer size to the start address of command No. 2 is the start address of command No. 3. However, although the value obtained by adding its transfer size to the start address of command No. 3 is the start address of command No. 4, the transfer direction is read (data transfer from the memory system 10 to the host). From the above, it is determined that these three commands No. 1 to No. 3 are of sequential transfer. Thus, the transfer type for the area (access area) of from address 0x0000 to smaller by one word than address 0x3000 is sequential transfer. That result is registered in FIG. 4B.

In the command information of FIG. 4A, command No. 4 is of read in transfer direction. Also, command No. 5 is of read in transfer direction, but the value obtained by adding its transfer size to the start address of No. 4 is not the start address of No. 5. Hence, command No. 4 is determined to be of random transfer. Thus, the transfer type for the area of from address 0x3000 to smaller by one word than address 0x4000 is random transfer, and that result is registered in FIG. 4B.

In the command information of FIG. 4A, two commands No. 5 to No. 6 are of read, and the value obtained by adding its transfer size to the start address of No. 5 is the start address of No. 6. Hence, these two commands No. 5 to No. 6 are determined to be of sequential transfer. Thus, the transfer type for the area of from address 0x6000 to smaller by one word than address 0x8000 is sequential transfer. That result is registered in FIG. 4B.

As such, if the access targets of commands received consecutively in terms of time are consecutive areas, and the transfer directions are the same, then the type information about the areas is registered as sequential, and if the access targets of commands received consecutively in terms of time are not consecutive areas but areas placed at intervals, or if the access targets of commands received consecutively in terms of time are consecutive areas, and the transfer directions are different, then the respective type information about the areas are registered as random.

The transfer type conjecturing circuit 15, when receiving a command from the command receiving unit 12, checks the address specified by the command against the type information of the command history storing unit 20 to find out whether the address is in a sequential-transfer area or a random-transfer area, and updates the end number threshold and the time-out interval of the interruption generating circuit 18 based on the result.

In general, an area for which sequential transfer is performed is likely to be a target of sequential transfer from then on, and an area for which random transfer is performed is likely to be a target of random transfer from then on. Thus, the conjecturing of the transfer type by the transfer type conjecturing circuit 15 is to determine whether a newly received command is to be dealt with as sequential transfer or random transfer based on the history of the past commands. Specifically, if the record that commands received consecutively in terms of time were the same in transfer direction and accessed consecutive areas exists in the command history information (type information), then the type of transfer invoked by a command to access one of the areas is conjectured to be sequential transfer. If the record that commands received consecutively in terms of time were different in transfer direction, or were the same in transfer direction, but accessed areas placed at intervals exists in the command history information (type information), then the type of transfer invoked by a command to access one of the areas is conjectured to be random transfer.

Note that the same reference numerals are used to denote the same constituents as in the first embodiment with description thereof being omitted. The method of controlling the memory system 10 in the second embodiment is the same in basic process as shown by the flow chart of FIG. 2, being different only in the way of conjecturing the transfer type than in the first embodiment.

In the second embodiment, the command history information is stored in which is accumulated information including, for each received command, whether it is a data transfer command, the transfer direction, the access area, and the transfer type, and when executing a received command, the type of transfer into/from the address specified by the command is conjectured from the command history information so that the end number threshold and the time-out interval are set based on the result. Thus, the memory system 10 can dynamically change the occurrence timings of interruptions according to whether to be sequential transfer or random transfer, which has the effect that interruption load can be reduced with securing performance. The change of the end number threshold can be performed without invalidating the functions of the processing unit in the memory system 10, thus with no overhead occurring.

Further, when conjecturing the transfer type using the command history, the size of data to be transferred can also be conjectured from that history, and hence the end number threshold can be set accordingly. In this case, an optimum end number threshold can be set as compared with the first embodiment.

In the first and second embodiments, a command requesting to reduce interruption frequency may be received from the host. In this case, the transfer type conjecturing circuit 15 may change the end number thresholds for sequential transfer and random transfer according to the request. Also in this case, the relation that the end number threshold for sequential transfer is greater than or equal to that for random transfer is maintained.

In the SATA, an SAS (Serial Attached Small computer system interface), and the like, a queuing command is defined which enables the memory system 10 to notify by an interruption the completion of multiple commands collectively to the host at its discretion. Accordingly, the interruption generation of the above embodiments may be applied to command completion notification for such a queuing command.

Further, at the time of emergency occurrence such as error occurrence, the end number threshold can be changed to a minimum. For example, the occurrence of a situation where damaged data cannot be corrected with an error correction code or the like when executing a read command, can be cited as emergency occurrence. In this case, the memory system 10 transmits an error response (a response having an uncorrectable error bit (UNC bit) set to 1 in the case of, e.g., ATA Standard) to the host. And the end number threshold should be set to a minimum when such a response is detected.

Further, the first and second embodiments may be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile storage memory;
a command receiving circuit that receives commands from a host;
a command transmitting circuit that transmits an interruption signal upon the execution of the commands to the host;
a command queue that queues the commands;
a transfer executing circuit that executes the commands queued in the command queue sequentially to write data into the nonvolatile storage memory or to read data from the nonvolatile storage memory;
an end number counter that, after transmitting the interruption signal to the host, counts the number of commands that the transfer executing circuit has finished executing;
an interruption generating circuit that generates an interruption signal for the commands executed by the transfer executing circuit, the number of the commands being one or greater, when the end number counter is greater than or equal to a first threshold; and
a transfer type conjecturing circuit that determines whether the transfer type of a first command to be first executed after transmitting the interruption signal, which is queued in the command queue, is sequential transfer or random transfer and sets the first threshold at a smaller value when determining that the transfer type is the random transfer than when determining that the transfer type is the sequential transfer.

2. The memory system according to claim 1, wherein the transfer type is determined based on an address, size, and transfer direction contained in the first command and an address and transfer direction contained in a second command to be executed next to the first command.

3. The memory system according to claim 2, wherein the transfer type conjecturing circuit determines being sequential transfer if a value obtained by adding a first size specified by the first command to a first address of an access target specified by the first command is a second address of an access target specified by the second command.

4. The memory system according to claim 1, further comprising:
a timer that, after transmitting the interruption signal to the host, measures a time from when the transfer executing circuit starts executing the first command, wherein
the interruption generating circuit generates an interruption signal for the commands executed by the transfer executing circuit, the number of the commands being one or greater, when the end number counter becomes greater than or equal to the first threshold or when the timer finishes counting a time-out interval, and
the transfer type conjecturing circuit sets the time-out interval at a value different between when determining being the sequential transfer and when determining being the random transfer.

5. The memory system according to claim 4, wherein the time-out interval set when the transfer type conjecturing circuit determines that the transfer type is the random transfer is smaller than the time-out interval set when determining that the transfer type is the sequential transfer.

6. The memory system according to claim 1, wherein when receiving a request to reduce interruption frequency from the host, the transfer type conjecturing circuit changes the first threshold based on the reduction request.

7. A memory system comprising:
a nonvolatile storage-memory;
a command receiving circuit that receives commands from a host;
a command transmitting circuit that transmits an interruption signal upon the execution of the commands to the host;
a command history information storing circuit that stores history information about commands received in the past;
a transfer executing circuit that executes the commands received to write data into the nonvolatile storage memory or to read data from the nonvolatile storage memory;

an end number counter that, after transmitting the interruption signal to the host, counts the number of commands that the transfer executing circuit has finished executing;

an interruption generating circuit that generates an interruption signal for the commands executed by the transfer executing circuit, the number of the commands being one or greater, when the end number counter is greater than or equal to a first threshold; and a transfer type conjecturing circuit that determines whether the transfer type of each of the commands received by the command receiving circuit is sequential transfer or random transfer based on the history information stored in the command history information storing circuit and sets the first threshold at a smaller value when determining that the transfer type is the random transfer than when determining that the transfer type is the sequential transfer.

8. The memory system according to claim 7, wherein the transfer type is determined to be sequential transfer if an address contained in the each command received is included in an area of the sequential transfer in the history information and is determined to be the random transfer if an address contained in the each command received is included in an area of the random transfer in the history information.

9. The memory system according to claim 7, further comprising:

a timer that, after transmitting the interruption signal to the host, measures a time from when the transfer executing circuit starts executing the command, wherein the interruption generating circuit generates an interruption signal for the commands executed by the transfer executing circuit, the number of the commands being one or greater, when the end number counter becomes greater than or equal to the first threshold or when the timer finishes counting a time-out interval, and the transfer type conjecturing circuit sets the time-out interval at a value different between when determining being the sequential transfer and when determining being the random transfer.

10. The memory system according to claim 9, wherein the time-out interval set when the transfer type conjecturing circuit determines that the transfer type is the random transfer is smaller than the time-out interval set when determining that the transfer type is the sequential transfer.

11. The memory system according to claim 7, wherein the history information includes the direction of data transfer by the command and the target area of access by the command.

12. The memory system according to claim 7, wherein when receiving a request to reduce interruption frequency from the host, the transfer type conjecturing circuit changes the first threshold based on the reduction request.

13. A memory system comprising:
a nonvolatile memory; and
a controller circuit configured to queue commands received from a host device and to generate an interruption signal, the interruption signal indicating to the host device that the memory system executes at least one command among the queued commands, wherein the controller circuit generates a first interruption signal for a first command, execute a second command and after a first interval, generates a second interruption signal for the second command, and the first interval in a case where the second command requests a random transfer with respect to the first command is shorter than in a case where the second command requests a sequential transfer with respect to the first command.

14. The memory system according to claim 13, wherein the controller circuit determines, whether the second command requests the random transfer or the sequential transfer, based on an address and a transfer size contained in each of the first and second commands.

15. The memory system according to claim 14, wherein the controller circuit determines that the second command requests the sequential transfer in a case where a value obtained by associating a first transfer size with a first address becomes a second address, the first transfer size and the first address being contained in the first command and the second address being contained in the second command.

16. The memory system according to claim 13, wherein the controller circuit includes a timer circuit to measure a time since the second command is executed and changes the first interval by changing a timeout value that the timer circuit measures.

17. The memory system according to claim 13, wherein the controller circuit further executes one or more third commands between the execution of the second command and the generation of the second interruption, and changes the first interval by changing a number of the third commands.

18. The memory system according to claim 17, wherein the second interruption signal contains information of both the second command and at least one of the third commands.

19. The memory system according to claim 17, wherein the controller circuit includes a timer circuit to measure a time since the second command is executed and in a case where the timer circuit detects a timeout, the controller circuit generates the second interruption signal in response to the timeout.

20. The memory system according to claim 13, wherein the controller circuit further changes the first interval based on a command received from the host device.

* * * * *